United States Patent [19]

Gross et al.

[11] Patent Number: 4,944,554
[45] Date of Patent: Jul. 31, 1990

[54] ACTIVE BIOMECHANICAL CHAIR

[76] Inventors: Clifford M. Gross, 1675 Northern Blvd., Roslyn, N.Y. 11756; James P. Santos, 223 Rockingstone Ave., Larchmont, N.Y. 10538

[21] Appl. No.: 377,804

[22] Filed: Jul. 12, 1989

Related U.S. Application Data

[63] Continuation of Ser. No. 103,739, Oct. 2, 1987, abandoned.

[51] Int. Cl.⁵ .................. A47C 1/022; B60N 1/02
[52] U.S. Cl. ........................... 297/284; 297/330; 297/337; 297/391
[58] Field of Search ............. 297/284, 330, 337, 406, 297/407, 391; 5/432, 446, 447

[56] References Cited

U.S. PATENT DOCUMENTS

| | | |
|---|---|---|
| 240,050 | 12/1881 | Starr . |
| 535,783 | 3/1895 | Archer . |
| 566,675 | 8/1896 | Forney . |
| 855,656 | 6/1907 | McNamara, Jr. et al. . |
| 958,356 | 5/1910 | Bode ................................. 297/284 |
| 1,471,168 | 10/1923 | Katz . |
| 1,629,306 | 6/1926 | Reeder . |
| 2,139,028 | 9/1937 | Mensendicck et al. . |
| 2,666,476 | 1/1954 | Lycan . |
| 2,991,124 | 7/1961 | Schwartz . |
| 3,106,423 | 10/1963 | Schwartz . |
| 3,288,525 | 11/1966 | Cerf . |
| 3,321,241 | 5/1967 | Froelich . |
| 3,464,754 | 1/1967 | Gottfried et al. . |
| 3,497,259 | 2/1970 | Sherfey . |
| 3,567,283 | 3/1971 | Herbert . |
| 3,596,990 | 8/1971 | Gottfried et al. . |
| 3,600,037 | 8/1971 | Lohr . |
| 3,730,589 | 5/1973 | Lane . |
| 3,833,257 | 9/1974 | Dove . |
| 3,888,540 | 6/1975 | Protze et al. ................. 297/417 X |
| 3,948,558 | 4/1976 | Obermeier et al. . |
| 3,973,797 | 8/1976 | Obermeier et al. . |
| 3,990,742 | 11/1976 | Glass et al. . |
| 4,018,477 | 4/1977 | Hogan . |
| 4,097,088 | 6/1978 | Meiller . |
| 4,155,593 | 5/1979 | Swenson et al. . |
| 4,182,533 | 1/1980 | Arndt et al. . |
| 4,239,282 | 12/1980 | White . |
| 4,278,291 | 7/1981 | Asai . |
| 4,295,681 | 10/1981 | Gregory . |
| 4,353,595 | 10/1982 | Kaneko et al. . |
| 4,437,702 | 3/1984 | Agosta . |
| 4,469,374 | 9/1984 | Kashihara et al. . |
| 4,505,513 | 3/1985 | Barley . |
| 4,531,779 | 7/1985 | Hashimoto . |
| 4,550,949 | 11/1985 | Sakamoto . |
| 4,564,235 | 1/1986 | Hatsutta et al. . |
| 4,634,179 | 1/1987 | Hashimoto et al. ............ 297/284 |
| 4,640,549 | 2/1987 | Yokota . |
| 4,659,145 | 4/1987 | Obersteiner ................... 297/330 |
| 4,687,251 | 8/1987 | Kazaoka et al. .............. 297/337 |
| 4,690,456 | 9/1987 | Chiba et al. .................. 297/284 |
| 4,720,146 | 1/1988 | Mawbey et al. ............. 297/408 X |

FOREIGN PATENT DOCUMENTS

| | | |
|---|---|---|
| 2226572 | 12/1973 | Fed. Rep. of Germany ...... 297/330 |
| 2912755 | 10/1980 | Fed. Rep. of Germany ...... 297/330 |
| 2922619 | 12/1980 | Fed. Rep. of Germany ...... 297/284 |
| 3222832 | 12/1983 | Fed. Rep. of Germany ...... 297/330 |
| 91428 | 7/1980 | Japan ................................. 297/330 |
| 138024 | 10/1981 | Japan ................................. 297/330 |
| 37550 | 2/1986 | Japan ................................. 297/330 |
| 81/02711 | 10/1981 | PCT Int'l Appl. ................ 297/330 |

Primary Examiner—Peter R. Brown
Attorney, Agent, or Firm—Jones, Tullar & Cooper

[57] ABSTRACT

A seat housing a multiplicity of adjustable horizontal planes connected to a processor in turn connected to an input device responding to a prerecorded spinal profile information of an individual's spinal configuration submitted to the input device. A seat pan, inclinable and pivotally mounted, on rails that permit horizontal movement relative to the back rest is also supported by a viscoelastic layer. Horizontally adjustable headrest is mechanically linked to vertically adjustable arm supports to allow vertical movement of the assembly, matching that of the vertical displacement of the seat pan when the seat is in use.

13 Claims, 6 Drawing Sheets

ACTIVE BIOMECHANICAL CHAIR

This is a continuation of co-pending application Ser. No. 103,739 filed on Oct. 2, 1987, now abandoned.

CROSS REFERENCE TO RELATED APPLICATIONS

This application discloses certain subject matter in common with application Ser. No. 013,171, filed Feb. 10, 1987, which in turn is a continuation of application Ser. No. 550,162, filed Nov. 9, 1983, now abandoned.

BACKGROUND OF THE INVENTION

In transportation industries, offices and homes, people are often subjected to long periods of sitting. Operators of aircraft, trucks, buses, automobiles, computer terminals, assemblers, office workers, users of wheelchairs and leisure chairs experience difficulty remaining comfortable when seated over extended periods.

For some, discomfort may be only an inconvenience. For most, however, discomfort goes well beyond inconvenience into substantial amounts of lost time off jobs, medical expenses, insurance payments and for some, a necessary change of profession.

In addition to these drawbacks, the costs to industry in fatigue and loss of accuracy in computer terminals, for example, or decreased efficiency and alertness in the transportation industries, may be incalculable.

Numerous devices and means for increasing the comfort level when seated by decreasing the spinal stresses have been devised and are well known in the art. There have been many lumbar support devices that are supposed to aid in maintaining the spinal lordosis. These are mainly singular units that do not account for individual differences. Other devices for head support, variable leg supports and vibration attenuation do not address themselves to the numerous physiological variables of each individual.

Although many of these devices have been useful, these developments have fallen far short of the goal, namely, maximum comfort and efficiency for the seated user.

Human beings are virtually infinitely variable in height, weight, ratios of arm, neck, leg and spinal column lengths and configurations. Maximizing comfort, reducing fatigue and increasing accuracy both on and off the job when seated, requires a close examination of the human body, it's structure and stresses and how these are affected when seated.

The biomechanics of the human spine is quite complex. For seated individuals, the spinal forces are determined by an exacting interplay of spinal geometry, muscle tension, ligament tension, pelvic rotation, and vibration. A common way for expressing this biodynamic system is the measurement of the intradiscal pressure. The greater the disc pressure, the greater is the cumulative strain on key spinal elements.

Additionally, as disc pressure increases, not only is there an increased likelihood of disc fatigue due to the pressure itself but, over time, there is a reduction in the fluid content of the nucleus pulposus (center disc). The healthy nucleus pulposus contains between 70% and 90% fluid which is mostly water. This fluid is essential for distributing the compressive, tensile and shear etressea imposed on the disc.

A key principle in correct biomechanical chair design is to minimize spinal disc force or pressure. This minimization of spinal forces may be brought about by having the seated individual spinal contour partially restored to that which exists when the individual is standing.

Studies have shown that, when one sits down, the spinal lordosis flattens approximately 38 degrees. Approximately two thirds of this flattening is due to the rearward rotation of the pelvis as the ischial tuberosities come in contact with the seat pan. The remaining one third of the spinal flattening is due to the realignment of the vertebral bodies.

One goal of biomechanically correct seating is to have the seated spinal contour matched by the shape of the back rest. Once this is accomplished, increased pressure should be applied to those parts of the spine which have undergone undue flattening in the sitting process.

A second principle of correct biomechanical chair design addressing two thirds of the flattening of the spinal contour is the inclination of the seat pan. Mandal ("The Seated Man",1985) has shown that, by increasing the seat pan downward, you can reduce some of the rearward pelvic rotation relative to the horizontal seat pan. By derotating the pelvis in this manner, you can help restore some of the spinal curvature lost in sitting.

Specifically, the most efficient way to reduce the spinal pressure on the discs is a combination of forward tilting of the seat pan, back rest spinal contour matching and restoration and rearward inclination of the entire back rest. The latter of these promotes a greater sharing of the head, torso and arms between the seat pan and the back rest.

In driving and other work station postures, comfort, practicality and safety limit the adjustability range and benefit of any one of these adjustment features. Therefore, while it is necessary to achieve practical spinal stress reduction and support, it ia necessary to combine the three chair adjustment strategies into one easily adjustable chair.

To bring about the correct adjustment of back rest contour, seat pan inclination and back rest inclination in a practical time interval, it is necessary to automate the seat adjustment mechanism.

The biomechanical goal of the present invention is not only the development of spinal stress reduction and safe supportive seating but to also allow the user to achieve these benefits in the normal course without undue time or effort. It is therefore desirable that the biomechanics of correct seating be combined with an easy-to-use automated method of seat adjustment. The result is not only a biomechanically correct chair but also a seat adjustment system.

Additional biomechanical factors which this chair addresses is the attenuation of spinal vibration through the use of viscoelastic polymers. Shock transmitted through a vehicle to a seat and it's occupant has the effect of reducing fluid content of the spinal nucleus pulposus. Repeated shock and vibration therefore plays an important role in the stress distribution capacity of the spine.

It is well known that bus and truck derivers have among the highest frequencies of back related injuries. In vehicular applications, vibration attenuation is important to maintain the integrity of the spinal structure.

Another biomechanical aspect of correct seating is proper cervical spine support. As the head weighs approximately 7% of total body weight, the forces which may be placed on the cervical disc may be quite extensive. To minimize cervical disc pressure, it is necessary to balance the skull over the atlanto-occipital joint. In doing so, cervical shear and compression forces are minimized.

To achieve the cervical spine stress minimization, it is necessary to maintain cervical spinal lordosis.

As exact spinal configuration may be considered unique for an individual, achievement of lordosis, kyphotic and cervical curves, requires tailoring of a seat's back rest.

Additionally, ingress and egress studies which have been performed have indicated a large percentage of maximum spinal forces needed to enter and leave a vehicle seat. As the mean age of the American population in 1987 is increasing, 6,000,000 endure back pain and injury. An important feature of the biomechanically correct vehicular seat design is the ability of the seat to rotate outward, facing the car door once the door is open. A necessary safety feature for this improvement is an ignition interlock which will not allow the vehicle to start or move with the seat in the rotated, unlocked position.

OBJECTS OF THE INVENTION

The present invention eliminates the foregoing problems of present devices while offering advantages not previously enjoyed.

It is therefore an object of the present invention to provide a seat that will adjust itself to a seated individual's spinal configuration in response to a command by an input device.

It is a further object of the present invention to allow the individual to adjust the seat to his liking, when desired, by electrical or manual means.

It is a still further object of the present invention to reduce the forces on the spinal column by offering an adjustable support for the head and cervical area of the individual.

Another object of the present invention is to provide a tilting seat pan such that the front of the seat may be tilted downward for improved leg circulation and spinal lordosia.

Still another object of the present invention is to provide vibration attenuation by mounting the seat assembly on a viscoelastic material.

Yet another object of the present invention is to provide a means of rotating the seat assembly to simplify egress in confined areas such as automobiles.

A still further object of the present invention is to provide a seat pan that will enable the user to adjust the seat pan length relative to the back rest to allow for femur length adjustment.

Yet another object of the present invention to provide vertically adjustable arm rests for user comfort.

Still another object of the present invention is to provide a means of allowing the head rest and arm rests to move in concert in response to vertical movement of the seat pan relative to the seat mounting deck.

SUMMARY OF THE INVENTION

Approximations to spinal curvature produce approximations in spinal force reductions. The present invention was developed with this fact in mind. In achieving one of it's purposes, the present invention includes both automatic and manual aspects.

It is an essential feature of the automatic aspect to provide a chair for any use which is active biomechanically, i.e., is adjustable to conform, at least one portion of the chair, to a corresponding profile of the seated occupant in accordance with a prerecording of the profile. The prerecorded profile may reflect the occupant's spinal profile or femur length, for example. The particular profile may be made by manual measurement, three dimensional locating machines or optical means such as lasers. Femur length can be encoded on a single axis, whereas a spinal profile will be encoded on XY axes with a Z axis option in the event a back configuration including the transverse axis is to be implemented. The developed profile is encoded on a recording device such as a magnetic stripe card. Profiles embodying desirable corrective features may also be encoded on the recording device.

In one form of the present invention, the chair includes a series of horizontal parallel beams or plates located on a back rest of the chair, each connected to e reversible motor through a lead screw on the motor shaft translating rotary motion to linear motion. Each motor, according to the automatic aspect of the invention, is actuated in response to the encoded profile on the card, badge or other device on which encoding can occur. A reader that reads the encoded device is connected to a processor that is, in turn, connected to, signals and activates the individual motors, simultaneously or sequentially, to adjust their associated beam or plate to assume the desired encoded spinal profile.

Resilient material such as a polymer foam, sponge rubber or a sandwich combination bridges the gape between the parallel beams when such beams are in their set positions. The vertical distances between the beams ideally should be less than the vertical distance between the spinal vertebrae.

In addition to the basic function of customizing a back rest to an individual's spinal configuration, a similar arrangement, by extension, is proposed, for a head and cervical support with both vertical and horizontal movement thereby offering the individual a seating design customized to his or her cervical region and head.

This automatic arrangement can be overridden by a manual keypad or switches controlling each beam and enabling the seated person to alter the profile at will. An important adjunct to the sensory feedback to the seated individual's back when operating the manual override is a means to visually display the relative position of the plates or beams being moved. A graphics display serves several purposes. It offers an additional sensory feedback for the individual when viewing the graphic display either of the encoded profile in the automatic mode or what positions are selected in the manual override. It also offers a visual confirmation of the adjustment. In addition, with numbered LED's for example, a numeric combination may be offered that can confirm the selected profile to the user or indicate to the user what adjustments to make. This feature will be useful in the event the user does not have the encoded card on his or her person, a non-card user is seated in the chair or when the seated individual is making profile adjustments for additional comfort.

Graphics may be permanently displayed whether the unit is either in an automatic or manual mode.

An alternate form of the invention provides manual switches as in the override mode in conjunction with a graphic display and without the automatic embodiment. In this case, the user will operate the switches activating the actuators using the procedure described when the user overrides the system or does not possess an encoded card. Memory integrated chips can be included in this system to enable the user to call up a previously coded profile when indicia are used identifying each LED.

In order to maintain the desired spinal lordosis, a seat pan tilting adjustment is provided. This is achieved by hinging the seat pan at the rear of the seat. The seat pan is tilted by the use of a frame mounted reversible actuator or electric motor with a lead screw driving a seat pan mounted nut. The seat pan may also be activated by the card or badge automatic means described :or the back portion of the seat including the manual override.

The seat pan assembly contains tracks on which the assembly rests. The seat pan assembly may also be activated by the encoded device through a reversible actuator, seat pan mounted rack and track frame mounted pinion that drives the seat pan assembly fore and aft to comfortably accommodate persons with different femur lengths. A manual override enables the user to adjust the projecting seat pan length at will.

The seat pan assembly may be rotated for ease of egress in limited access areas such as automobiles to minimize both physical effort, twisting and spinal stresses. In the case of automobiles, the seat assembly rests on a plate housing a curved slot whose radius corresponds to the radius from the pin axis about which the seat rotates to the curved slot. A guide pin attached to the seat assembly rides in the slot to define the predetermined limits of travel. In order to prevent the seat assembly from movement when the vehicle is in operation, a lock pin in the seat assembly acts as an interlock with the ignition by electric connection. A relay and solenoid ar activated when the ignition is turned on such that, a signal is effected if the solenoid activated pin is not locked in place indicating that the seat is not in it's proper frontal position.

Consistent with the infinite variety of biomechanical structure of individuals, spinal length varies with each person. Women's clothing is sold "short waisted" or "long waisted" and men's shirt sleeve lengths vary widely according to arm length. These variations require vertical arm rest adjustments to suit each individual. A person with a long spinal column and short humerus will require a higher arm rest position relative to the seat pan than a person with a short spinal column and long humerus. There are infinite variations between these extremes. It is therefore incumbent on an active biomechanical chair to accommodate these variations to be encoded on it's recording device for physical comfort and attenuation of biomechanical stress and fatigue.

Vertically adjustable elbow and forearm rests are also activated by both automatic and overriding manual means. Arm rests lie on a vertical track allowing the desired adjustments that may also be linked to the encoded device to be read and processed. In the case of automobiles, the arm rest on the door side may be similarly activated except that the assembly for that arm rest will be contained in the door assembly.

There will be instances where operators or other seated persons will not possess any encoded entry devices. The processor memory will have the option of leaving the seat settings at the last encoded position or in a "neutral" position with the encoded entry in memory to be called up when needed. When lacking in encoded entry devices, the "neutral" position of these seat adjustments will correspond to the ratios and profiles in current use to allow a reasonable degree of comfort to the majority of users. Overriding manual settings, however, will still remain.

In the case of office chairs or other applications where electrical sources are remote or inconvenient, battery power may be used since adjustments are normally infrequent.

Vibration forces, particularly vertical, can be detrimental to the spinal discs by promoting moisture loss therefore reducing resistance to physical stress. These vibrations can be attenuated by the use of a viscoelastic material such as "Sorbothane". The viscoelastic member is sandwiched between the seat assembly and vibrating deck or frame with fastener isolation means commonly used in industry.

The encoded entry device such as a card or badge used for seat adjustment, may also be used as a means of entry into a vehicle either as a supplemental code or as a primary code. This arrangement will make illegal entry more difficult. The method is similar to the key pad entry devices currently in use to unlock automobile doors except that the card or badge means of activation will be used.

DESCRIPTION OF THE DRAWINGS

Advantages of the preferred embodiments of the present invention will be apparent from the following drawings and description in which.

DESCRIPTION OF A PREFERRED EMBODIMENT OF THE INVENTION

Figure 1:
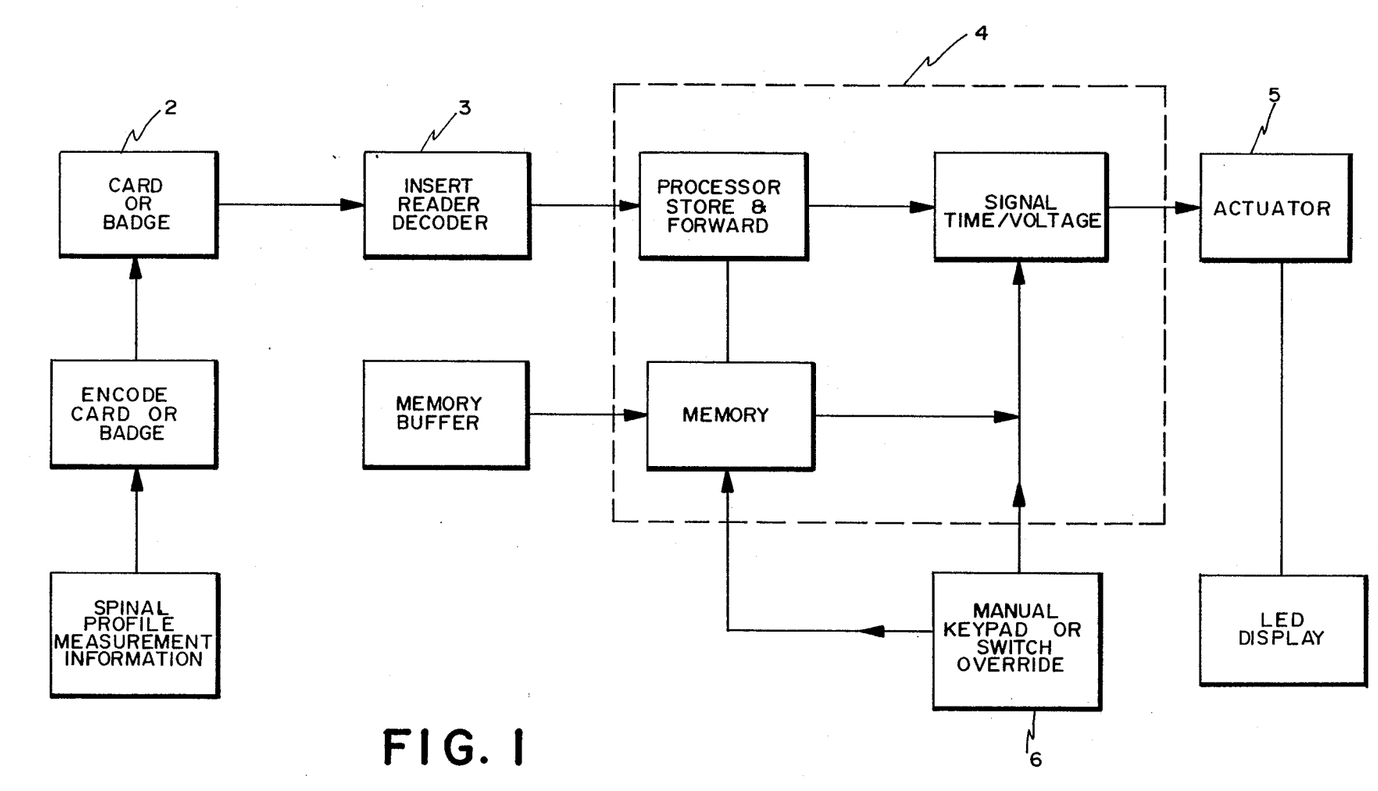
FIG. 1 is a flow diagram of the different operational elements of the system for actuator control.

In FIG. 1, the basic operational elements of a system for controlling the actuators of the present invention are shown. An individual spinal profile is measured and encoded into a portable device 2, such as model MBR 275 of peripheral Dynamics, Inc. through an encoder. The encoded device may take the form of a card, badge or key with a Magnetic Ink Character Recognition (MICR), Optical Character Recognition (OCR), Bar Code, spot codes such as fluorescent ink, perforations or notch systems, or magnetic wire Weigand type systems.

In use, the encoded device 2 is inserted into a reader 3 or decoder that reads the card or badge, translates the signal data through a central controller comprising a processor 4 that stores and forwards a signal to an actuator 5. The model MBR 275 may also serve as a reader.

The actuator will then adjust the structure it controls to assume the individual spinal profile encoded on the card or badge 2. Also included in this system is a memory in the processor 4 such that, with the entry of a code, the individual spinal profile will be called up and activated. The memory could comprise the Intel 8048 integrated chip, for example, or any ROM chip.

Included in the system is a manual override 6 in the form of a keypad or switches which can directly activate the actuators to their desired positions.

Figures 2, 3:
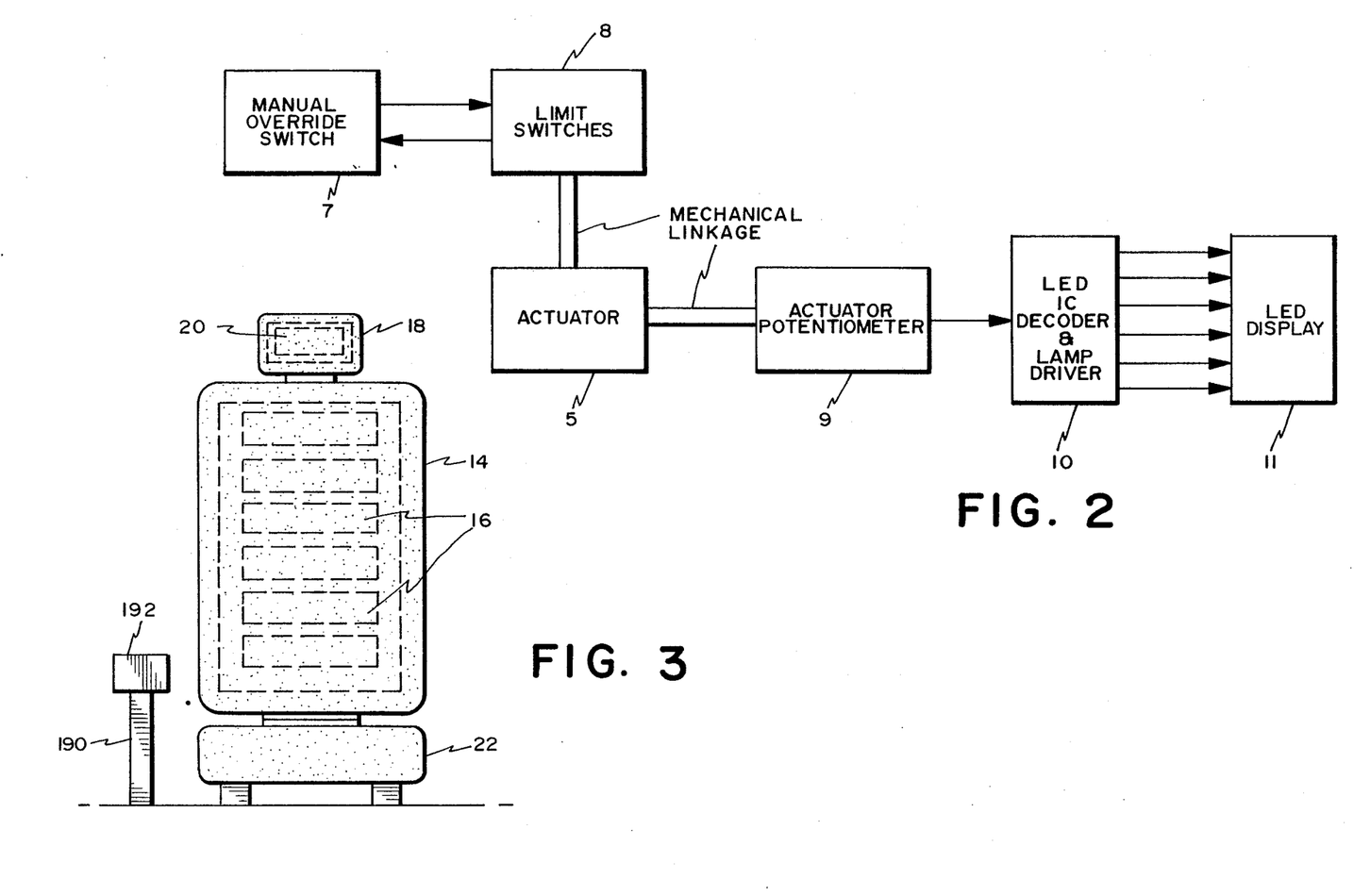
FIG. 2 is a flow diagram of the operational elements of the graphic display.
FIG. 3 is a schematic front view of a chair showing the horizontal plates of the system located in the back rest of the chair.

FIG. 2 shows a breakdown of the manual override 6 and LED graphic display. Manual override switch or key 7 activates the actuator 5 which is mechanically connected to limit switches 8 limiting plate travel with reversing feedback signal to switch 8 when plate travel limit is reached. Also mechanically coupled with actuator 5 is potentiometer 9 whose reference voltage generated by the movement of actuator 5 drives the LED integrated chip decoder and lamp drives 10. These multiple drives correspond to a row of LED's 11, one of which is energized, indicating the location of the plate. This system is repeated for each actuator and plate.

The rows of LED's can be arranged such that each horizontal row represents the range of plate movement. With each row of LED's stacked vertically and representing the plates, a profile of the plates will be indicated graphically by the LED's display corresponding to the spinal profile, for example. Variations on the graphics display can be made by those skilled in the art without departing :rom the spirit of the invention.

Referring to FIG. 3, back rest 14 houses a plurality of adjusting mechanisms including horizontal plates 16 that move horizontally employing the system described in the block diagram in FIG. 1. Slidably attached to the back rest 14 is a head rest 18 containing horizontal plate or plates 20, also able to move horizontally. Back rest 14 is affixed to a seat pan 22.

Figure 4:
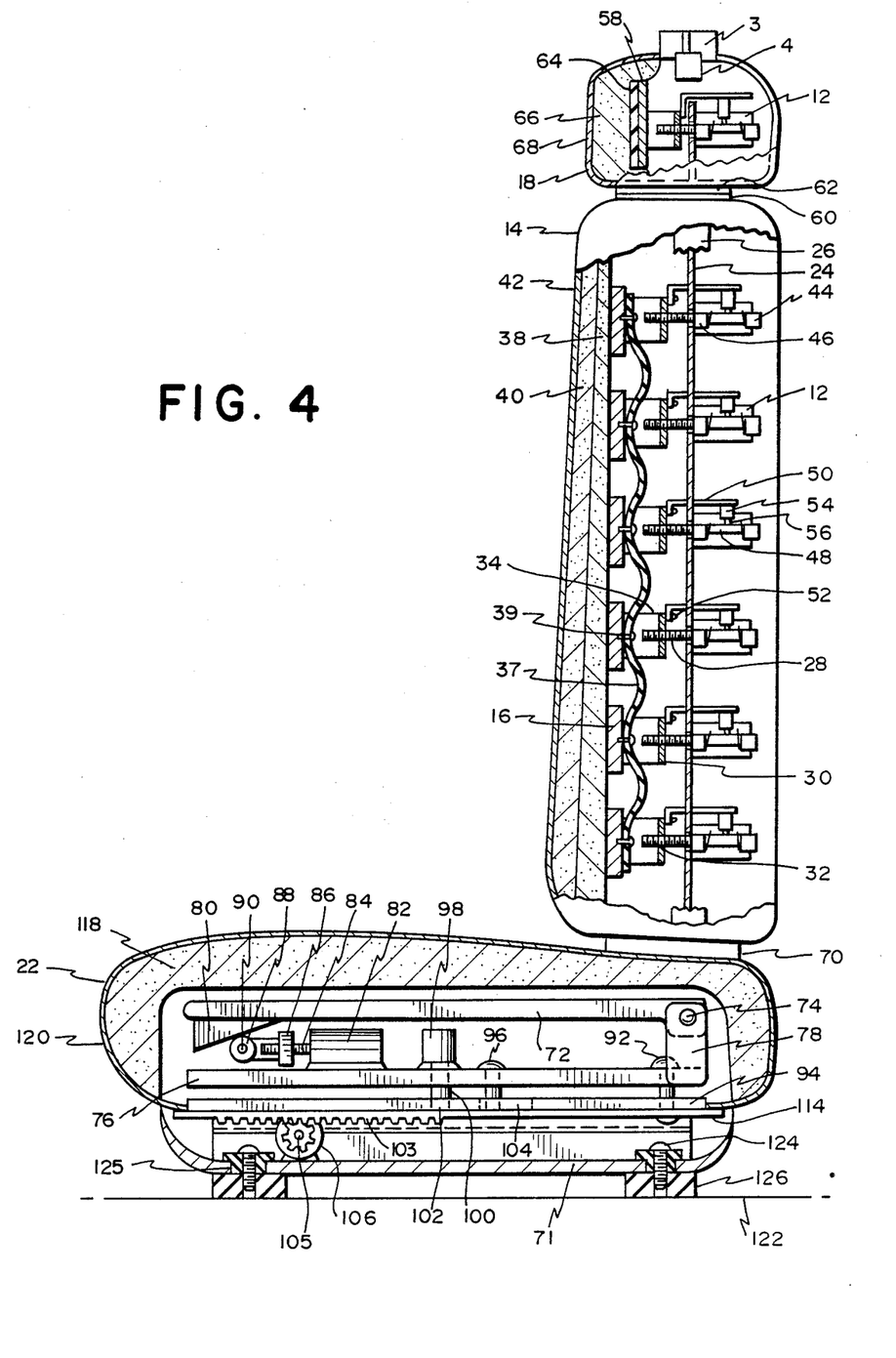
FIG. 4 is a schematic side view, primarily in section, of one preferred embodiment of an active biomechanical chair according to the present invention.

Referring now to FIG. 4, the card or badge is inserted into a reader 3. The reader 3 reads the encoded information and transmits appropriate signals to the processor 4. The reader 3 and processor 4 are shown mounted on the head rest 18, although it could be mounted to the back rest 14 or seat pan 22. The processor 4 forwards the activating digital or analog data to reversible actuators of the adjusting mechanism 12. Actuators 12, are mounted on a vertical support 24, in turn attached to a seat frame 26, with lead screws 28 acting as rotating shafts to actuators 12. As actuators 12 are activated, lead screws 28, are threaded into a movable support 30, housing threads 32, and connected through struts 34 to plates 16. Plates 16, in response to analog or digital signals to motors 12, will move horizontally to their respective encoded positions.

Plates 16, may be constructed of any material, with a polymer such as a polycarbonate preferred for light weight and resiliency under high pressures to reduce impact forces as well as allowing off center deformation in both vertical and horizontal directions while simultaneously maintaining desired support. Different materials may require different means for resiliency caused by off center forces. Normally the force against back rest 14 will be centrally focused and axial to the driver of plate 16. Two reversible actuators equidistant from the central axis of plate 16 may also be used, particularly if a Z axis component is added to the spinal configuration to be encoded to the magnetic stripe card or badge. Plates 16, are located adjacent to layers 38 and 40 of polymer foams, sponge rubbers or any combination thereof. These layers are covered by material 42, which may be fabric, leather or the like. The layers 38 and 40 and the material 42 form a front wall of the back rest 14 which define an inner surface and an outer surface.

Figure 5:
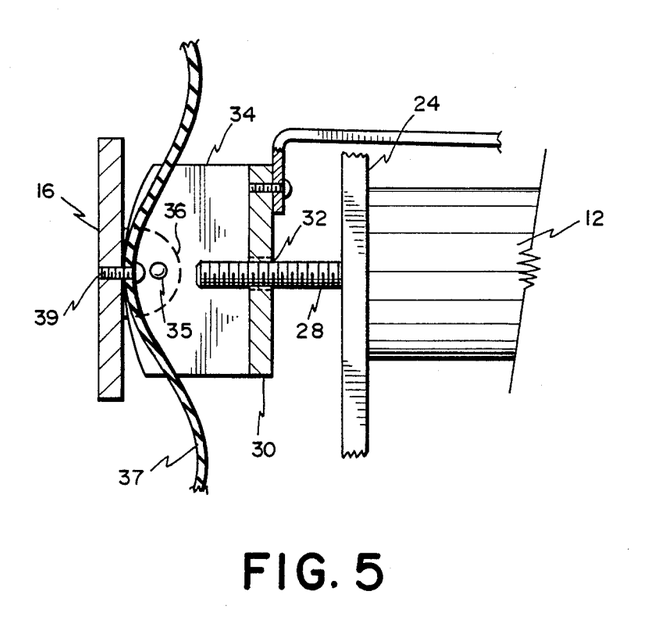
FIG. 5 is a schematic detailed view of an actuator assembly located in the back rest of the chair.

As seen in FIG. 5, horizontal pins 35 extend through flanges 36 of the plates 16 to allow the plates 16 to pivot about the horizontal axis defined by the pins 35. The pivotal mounting collectively configure the plates as a smooth integrated whole conforming to the individual spinal configuration, if rigid plates 16 and support members are employed. Plates 16 may also be shaped, horizontally, convex, concave or straight depending on the segment of the spinal column being supported.

To prevent rotational movement of plates 16 due to frictional forces when motors 12 are activated, two restraining straps 37 of sufficient resiliency to overcome the rotational forces interconnect plates 16 and are secured by screw 39 to each plate. It is understood that other means such as rails may also be employed to prevent rotation of plates 16.

Figure 6:
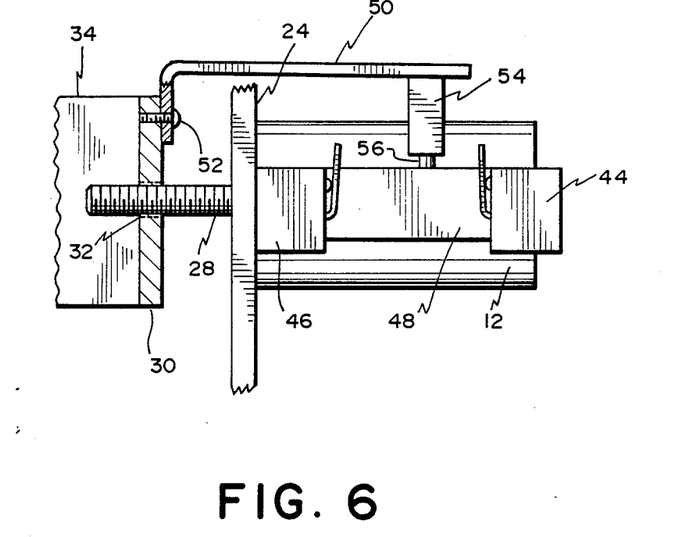
FIG. 6 shows, in schematic, a detailed view of a control of the actuator assembly FIG. 4.

Referring to FIG. 6, limit switches 44, and 46, as well as linear potentiometers 48, provide feedback information for control and options such as graphic display of the plate locations in, for example, rows of LED's, discussed hereinafter.

To aid in feedback and control, an arm 50, attached to movable support 30 via attachment screw 52, contains a projection 54 that moves linear potentiometer control indicator 56 and also acts as a stop control for the limit switches 44 and 46 mounted on the vertical support 24. Linear potentiometer control indicator 56 varies it's voltage output in accordance with the position of plate 16 to which it is linked.

Generally, servomechanisms, similar to that of processor 4 in FIG. 1, are closed loop systems that depend on the feedback concept for operation. A controlled variable output is forced to be a preassigned function of the reference input which is used to control an output position.

Feedback information and control is accomplished where the position of plate 16 is proportional to a reference voltage. The voltage range is proportional to the travel range of plate 16. The feedback input to the processor is derived from the potentiometer 48 through the position of potentiometer control indicator 56 linked to motor 12 and plate 16.

The potentiometer 48 is supplied with the same reference voltage. The reference voltage from the potentiometer 48, therefore, will vary between zero volts and the reference voltage as the plate 16 moves through it's range. The servo amplifier operates in such a way as to minimize the difference between the reference voltage and the feedback voltage derived from the potentiometer 48 as the movement of plate 16 approaches it's predetermined position Therefore, if a specific position is required or selected, that position represents a specific reference input voltage. The amplifier will then drive the motor 12 until the specific voltage is reached by the potentiometer 48 through potentiometer control indicator 56 with a zero voltage difference with the reference voltage. At that point, the amplifier will not produce any more signal and the motor 12, will cease to rotate with plate is having reached it's designated position.

Servoampifiers are well known in the art and are widely used, with variations, in numerous electromechanical and electronic devices.

Although mechanical actuation is accomplished by reversible electric motors forming the actuators 12 in the preferred embodiment by translating rotary motion into linear motion, linear motion may be accomplished by numerous other means. Rotary or stepping solenoids, driving cams, proportional solenoids directly or indirectly connected, stepper motors, pneumatic, hydraulic and other means to effect linear motion may be devised by persons skilled in the art without departing from the spirit of the invention.

The purpose of cushion material used in front of, and adjacent to the plates 16, is to lend structural support as well as comfort to the seated individual. The support is primarily for the segment of the back rest that lies between the plates. The vertical distance between the plates is most desireable when it is less than the vertical distance between the spinal vertebrae. Plate separations are to be close enough, in conjunction with cushion material, to bridge the gap between the plates while offering comfort in bridging the horizontal distances between the plates thereby resulting in a smooth contour.

The actuator embodiment for the head rest is similar to that of the back rest except that the head rest 18 is also moved horizontally relative to the back rest 14, by motor 12 being attached to seat frame 26 for actuating plate 58. Head rest 18, moves on rails 60, also attached to seat frame 26, via matching rails 62 attached to the head rest 18. Vibration absorbing viscoelastic material such as "Sorbothane" 64, is sandwiched between the front of the head support plate 58 and polymer foam or sponge rubber material 66. The head rest 18 is covered by material 68 which may be similar to material 42. The material 66 and 68 form a front wall of the head rest 18 which define an inner surface and an outer surface.

Present head restraint designs in automobiles are intended to protect the head and cervical spine in rear end collisions. In many cases, the head may be six inches or more from the head restraint. With the average head weight at approximately 7% of body weight, the average head will weigh 10 to 11 pounds for a body weight of 150 pounds.

The inertia of the head tends to hold it in a resting position following sudden anterior acceleration of the remainder of the body resting against a seat. The resulting forward pull applied by the trunk produces a moment and rotation of the head causing an extension of the cervical spine.

Although head restraints will minimize the phenomenon known as "whiplash", head restraints a considerable distance from the head and/or lower than an ideal position may result in injurious hyperextension. Without any restraint, the head, within 300 milliseconds of impact, can reach acceleration of 2 to 2.5 times the maximum vehicle acceleration.

Injury may also result from reactive forces when the head undergoes flexion with the deceleration of the body followed by extension as a result of recoil.

By utilizing a proper head and cervical support, injuries of this type can be minimized. In addition, it has been demonstrated that a firmer back rest reduces the injury potential by producing less acceleration. (Mechanisms of Head and Spine Trauma, Ed. by A. Sances, D. J. Thomas, C. L. Ewing, B. J. Larson, F. Unterharnscheidt; Aloray, 1986). A properly contoured back and head restraint should therefore result in minimal anterior acceleration.

With the head in contact with the head rest 18 in the present invention, the force on the head and cervical area will be substantially lower due to the minimal travel of the head rearward during an impact, restricted to the deformation of the cushioning material 64 and 66. Viscoelastic material 64, has the property of increasing stiffness and support as the rate of applied force to the head increases. This property also minimizes reactive forces. Viscoelastic materials such as "Sorbothane" behave similar to skin and ligaments in that they will stiffen in proportion to the rate of the application of force.

Stresses on the cervical and thoracic areas of the spine ore minimized when the head and it's weight is not only supported but restricted from some of the stress inducing movements when operating aircraft, automobiles and road equipment subject to various kinetic forces.

It is desirable, therefore, to be able to adjust the head rest 18 horizontally relative to the back rest 14 to reduce the distance from the head to the front wall of the head rest 18. The ideal displacement will place the head rest 18 in contact with the occupant's head. The necessary displacement for a given individual can also be encoded on a card or badge 2. A manual override control is also contemplated. In addition, the card may have a cervical profile encoded thereon, which would serve to adjust the front wall of the head rest 18 to conform to the cervical profile. This adjustment would follow the horizontal adjustment noted above.

Seat pan 22 (FIGS. 4 and 8), is connected to back rest 14 by a frame 70 that is attached to a horizontal seat pan support 71. Seat pan 22 contains a plate 72 hinged at the rear of seat pan 22 by horizontal pin 74. Pin 74 and plate 72 are attached to a plate 76 by a strut 78. The lower forward segment of the plate 72 contains an inclined plane 80 in contact with a reversible actuator assembly comprised of an actuator 82 mounted on the plate 76 and a lead screw 84 translating rotary motion to linear motion that drives a nut assembly. The nut assembly is comprised of a threaded clevis shaped nut 86 and a roller 88, connected to the clevis 86 via a pin 90.

Figure 8:
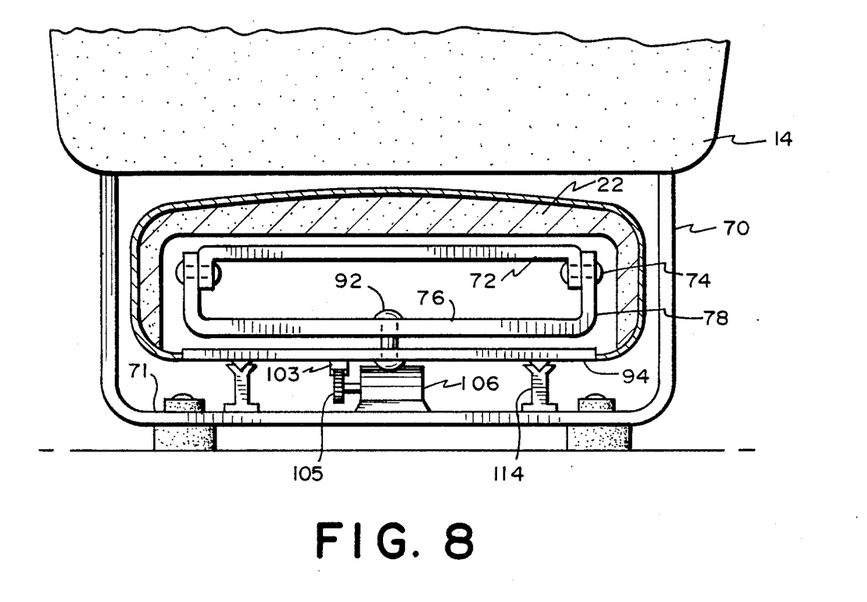
FIG. 8 is a schematic rear view of the seat portion of the chair.

Roller 88 rides along the inclined plane 80 when the actuator is activated lowering or raising the plate 72 to a predetermined or manually set position. Seat pan 22 inclination may be determined by card, badge or manual means similar to that of the back rest assembly already described.

Plate 76 through which a pin 92 is rotatably attached to plate 94, also contains a fixed pin 96. Also mounted on the plate 76 is a solenoid 98 and an activating pin 100.

Figure 7:
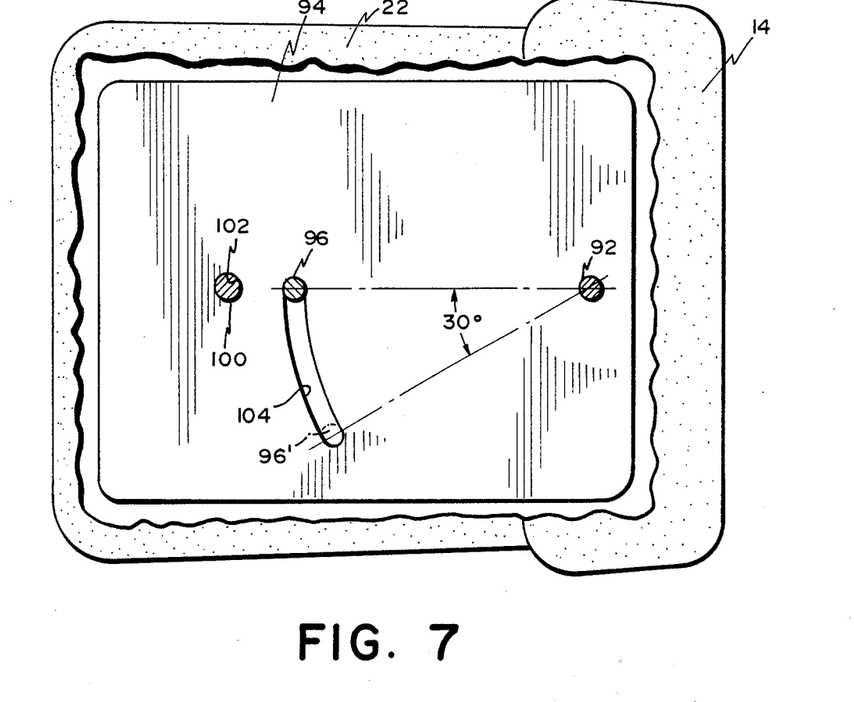
FIG. 7 is a schematic top view of a rotating mechanism of the seat portion of the chair.

Referring now also to FIG. 7, plate 94 housed in the seat pan 22, contains a groove 104 in which the pin 96, attached to the plate 76, fits. The radius of the groove 104 is determined by the distance between the pin 96 and the pin 92. Pin 92 serves as a pivot pin about which the assemblies on plates 72 and 76 rotate. A predetermined groove length or desired angle, in this case shown as 30 degrees, determines the limit of seat pan rotation. It's purpose is to facilitate ingress and egress into limited spaces such as automobiles with minimal skeletal and muscular stresses. In it's frontal position, as shown in FIG. 7, the pin 96 is in line with the pin 92 and the solenoid activated pin 100. In it's rotated position, the seat pan pin is seen as 96' establishing ease of movement.

In order to provide a fail-safe mechanism for locking the seat when a vehicle is in operation, an interlock is provided between the pin 100 and the ignition circuit of the vehicle. Pin 100, when activated by momentary solenoid 98, will lock the seat pan in the frontal position and provide electrical contact to enable engine startup. In this way, plates 72 and 76 cannot rotate relative to the plate 94. The solenoid is designed such that only momentary contact is necessary for the pin 100 to be in the raised or lowered locked position in matching hole 102. This type solenoid assembly design is well known in the art. In order to minimize interference with center consoles, door posts and rear leg room, when the seat pan 22 is rotated for ingress or egress, the pin 92 may be located in the rear outboard quarter of the seat pan next to the door. Preferably, the force for rotating the plates 72 and 76 relative to the plate 94 is the seated occupant, although an actuator can be provided.

Returning again to FIGS. 4 and 8, the assemblies on plates 72, 76 and 94 connected by strut 78 and pin 92 ride on and are slidably attached to rails 114. The rails 114 are attached to the frame 70 that, in turn, is attached to the support 71. Base plate 94 contains a rack 103 that is driven by a pinion gear 105 connected to a reversible actuator 106 mounted on the support 71. The rack and pinion arrangement will move the seat pan assembly 22 horizontally, altering the distance from the back rest 14 to the forward edge of seat pan 22 to accommodate varying femur lengths of individuals. Actuator 106 may also be integrated into the automatic badge or card system described for the back rest. The seat pan assembly 22 thus far described is housed by a cover 118 of a polymer foam, sponge rubber or a combination thereof and is covered by material 120 which may be similar to material 42 and 68.

Support 71 supporting the seat pan assembly 22, is mounted on the base frame 122 by bolts 124. Surrounding bolt 124 from the bolt head to the bottom of support 71 is a rubber or elastomeric compound 125 of medium durometer hardness. In order to attenuate vibrations that will be transmitted throughout the seat assembly, the mounting means of bolts 124 supporting seat pan 22 and back rest 14 are isolated by means of blocks 126 of viscoelastic material such as "Sorbothane" resting under support 71. By the placement of a viscoelastic material between the seat and the base frame or platform, it's inherent characteristics of vibration attenuation enable the spinal discs to better retain their moisture component and ability to withstand stresses while reducing fatigue and increasing comfort.

Viscoelastic materials such as "Sorbothane" mimic liquid properties in that they dispense energy outward from the impact source. This energy is dissipated within the material by deformation and does not permeate adjoining components. Each corner of a chair may have molded viscoelastic material designed to absorb vibration and shock under a specified anticipated weight and vibration frequency range. Material selection will then be made with proper material volume, area and durometer hardness to most efficiently achieve the desired comfort level. Because of viscoelastic material's tendency to "flow" under stress, the rubber cylinder 125 has been selected to surround bolt 124 through to the bottom of support 71 to support the stresses over that small area. This allows the viscoelastic layer under support 71 to be designed with a larger area able to properly withstand the anticipated stresses from weight, shock and vibration.

Figure 9:
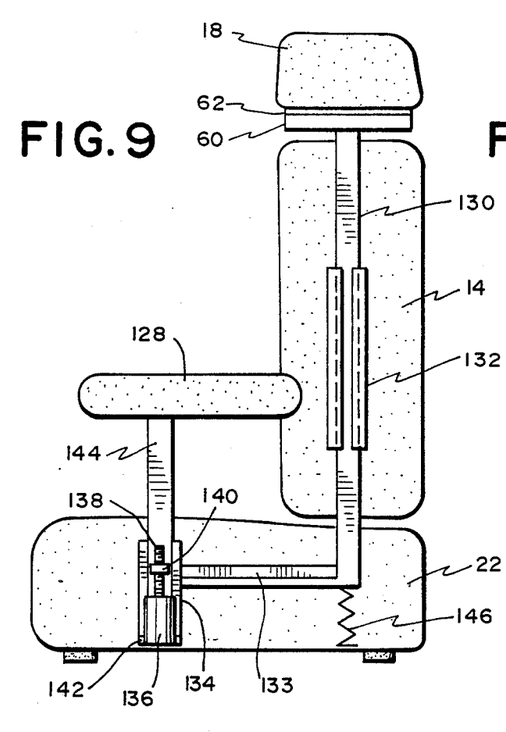
FIG. 9 is a schematic side view of the arm and headrest linkage.
Figure 10:
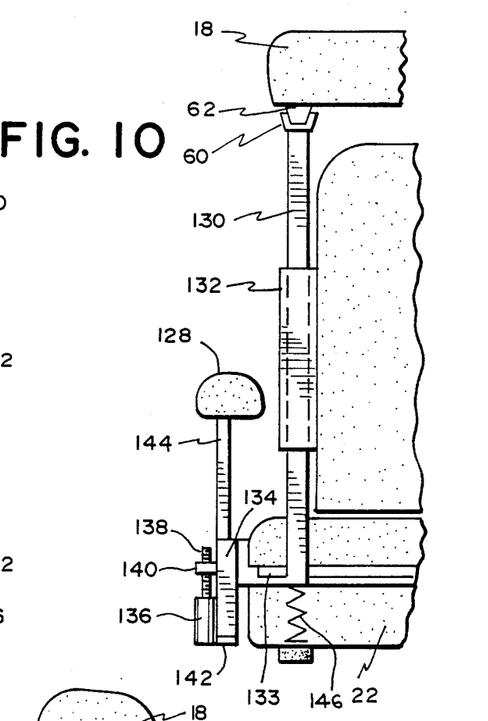
FIG. 10 is schematic rear view of the arm and headrest linkage.

FIG. 9 and FIG 10 address themselves to both adjustable arm rests and the linkage between the seat pan 22, arm rest 128, and head rest 18 for head and cervical support. When conveyances such as trucks, earthmoving equipment or aircraft experience bumpy conditions, the seat pan will deform vertically by virtue of the seated individuals' weight and kinetic forces. This embodiment describes a linkage minimizing the displacement of the change in height of the arm rests and head support relative to the seat pan deformation. Body movement relative to floor pedals, stick and steering mechanism will be such that there will be minimal effect on controls. By automatically or manually adjusting the arm rest height relative to the seat pan, maximum user comfort can be maintained by adjusting the glenohumeral angle as close to 90 to 105 degrees as possible.

Head rest 18 for head and cervical support, rides on a rail 62 which, in turn rides in a track 60 which is attached to vertical support member 130 that, in turn, is slidably affixed to a track 132 which is anchored to the frame assembly of the back rest 14. Support member 180 is attached to a plate 133 resting on the horizontal segment of the support member 130 whose end is fixed to a vertical track member 134. Arm rest 128 is vertically slidable in track member 134. The vertical movement of the arm rest 128 relative to track member 134 is controlled by a reversible actuator 136 through it's threaded lead screw 138 rotating in a nut 140 that is attached to the arm rest 128 via a strut 142. Thus, the assembly comprised of the arm rest 128 slidable in the track member 134, through a vertical member 144, the actuator 136, the lead screw 128, and the threaded nut 140, move in unison with the head and cervical support assembly 18 when displacement in the seat pan 22 is transmitted through the plate 132. It is also understood that the seat pan 22 may be linked independently to either head rest 18 or arm rest 128.

An optional spring and vibration damping device 146 may be inserted under the support member 130 as needed. It is noted that the arm rest actuator arrangement may also fall into the automatic card and badge reader system previously described.

Figure 11:
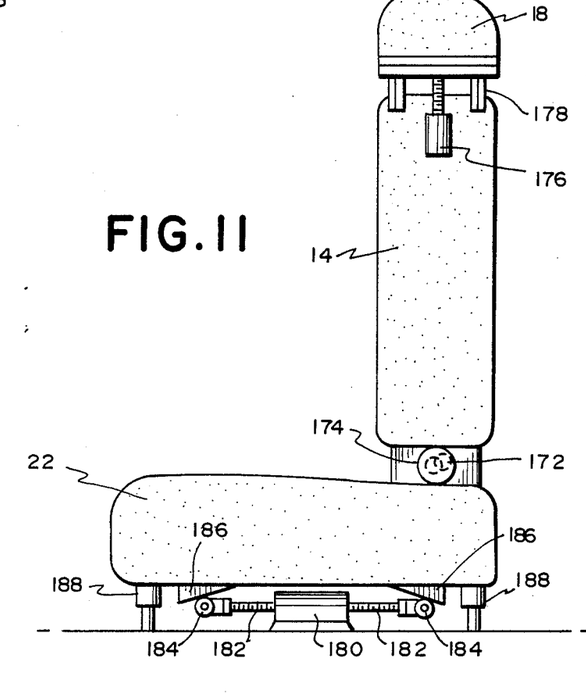
FIG. 11 shows, in schematic, the motor driven arrangement :or supplementary chair movements.

Referring to FIG. 11 conventional seat controls will also be included in the encoded devices such as the inclination of the back rest 14 relative to the seat pan 22 by reversible actuator 172 acting on a planetary gear 174. Head rest 18 can be vertically adjusted by a reversible actuator 176 riding on rails 178. Additionally, the seat pan 22 can be vertically adjusted by reversible actuator 180 whose threaded shafts 182 are comprised of opposite threads and act upon clevis and roller assembly 184 riding on inclined planes 186. The seat assembly rides on the sliding supports 188 that are isolated by viscoelastic polymers.

Referring again to FIGS. 1, 2 and 3, a feedback feature in conjunction with the LED display is provided. The LED display can be mounted adjacent to the chair, on the dashboard of an automobile or the like. FIG. 3 illustrates a display stand 190 adjacent to the chair. The display stand includes o display console 192 having a series of LED's visible on it's top surface. The LED's are electrically connected to the actuators 12, so that the displacement of the individual actuators is reflected by the LED's in a profile fashion, i.e.. the illuminated LED's produce an outline matching the displacement of the actuators. The LED's may also contain indicia so that the operator may produce the desired profile by setting his or her code to the manual switches that may also be housed in the display console 192. Memory integrated chips previously described may also be housed in the display console 192 to enable the user to easily call up his or her spinal profile.

It is evident from the foregoing, that the present invention provides for a seat that can automatically or manually conform to an individuals skeletal framework for maximum comfort and minimal stress. These novel features are intended to supplant or supplement those already present in seating design such as raising and lowering the seat and other known adjustments. Refinements and variations on the preferred embodiments described by those skilled in the art should not depart from the spirit of the present invention.

What is claimed is:

1. The combination, comprising:
    an active biomechanical chair comprising: a frame structure; a back rest mounted to the frame structure, said back rest including a front wall having an inner surface and an outer surface; a plurality of contour adjusting mechanisms which are spaced apart vertically relative to the front wall, each contour adjusting mechanism having plate means which are horizontally adjustable to engage the inner surface of the front wall, motor means connected to the plate means; seat means connected to the frame structure; a decoder; and a central controller; and
    a portable device having a prerecorded particular spinal profile or portion thereof, of an occupant of the chair encoded thereon, said spinal profile, or portion thereof, representing a condition of least intradiscal pressure of an occupant of the chair, said portable device engaging said chair to be read by said decoder and to activate said central controller for controlling the plurality of contour adjusting mechanisms by selectively actuating the individual motor means thereby adjusting the horizontal position of their associated plate means automatically as a function of the prerecorded particular spinal profile or portion thereof so that the outer surface of the front wall automatically conforms to the prerecorded particular spinal profile or portion thereof.

2. The combination as defined in claim 1,
    wherein said seat means includes an adjustable seat pan and means for adjusting the seat pan horizontally toward and away from the back rest; said combination further comprising:
    means for connecting the seat pan and the back rest; and
    a further portable device having a prerecorded particular femur length of an occupant of the chair encoded thereon, for adjusting the seat pan horizontal adjusting means automatically as a function of the prerecorded particular femur length.

3. The combination as in claim 2, wherein:
    said seat pan means further includes means for pivoting the seat pan in a horizontal plane with respect to the back rest.

4. The combination as in claim 3, wherein:
    said seat pan means further includes means for pivoting the seat pan in a vertical plane with respect to the back rest.

5. The active biomechanical chair as defined in claim 3, further comprising:
    locking means for locking the seat pan in its horizontal position relative to the back rest.

6. The combination as defined in claim 1,
    wherein the chair further comprises: a head rest mounted to the frame structure, said head rest including a front wall having an inner surface and an outer surface, and at least one contour adjusting mechanism which can be horizontally adjusted to engage the inner surface of the front wall of said head rest; and
    said combination further comprising:
    a further portable device having a prerecorded particular cervical profile, or portion thereof, of an occupant of the chair encoded thereon, for adjusting the horizontal position of each contour adjusting mechanism of said head rest automatically as a function of the prerecorded particular cervical profile or portion thereof so that the outer surface of the front wall of said head rest conforms to the prerecorded particular cervical profile or portion thereof.

7. The combination as defined in claim 6,
    wherein said seat means includes an adjustable seat pan and means for adjusting the seat pan horizontally toward and away from the back rest; said combination further comprising:
    means for connecting the seat pan and the back rest; and
    a still further portable device having a prerecorded particular femur length of an occupant of the chair encoded thereon, for adjusting the seat pan horizontal adjusting means automatically as a function of the prerecorded particular femur length.

8. The combination as defined in claim 7, wherein said seat means further includes means for pivoting the seat pan in a horizontal plane with respect to the back rest.

9. The combination as defined in claim 8, wherein:
    said seat means further includes means for pivoting the seat pan in a vertical plane with respect to the back rest.

10. The combination as defined in claim 1, further comprising:
    visual profile display means; and
    means for connecting the visual profile display means to said plurality of contour adjusting mechanisms for visually displaying the adjusted horizontal position of each plate means.

11. The active biomechanical chair as defined in claim 1, wherein the vertical distance between adjacent plate means is less than the vertical distance between spinal vertebrae.

12. The active biomechanical chair as defined in claim 1, further comprising:
    manual override means connected to the plurality of contour adjusting mechanisms for adjusting the horizontal position of each plate means independently of said spinal profile defining means for conforming the outer surface of the front wall to a particular spinal profile.

13. The combination, comprising:
    an active biomechanical chair, comprising: a frame structure; a back rest mounted to the frame structure, said back rest including a front wall having an inner surface and an outer surface, a plurality of contour adjusting mechanisms which are spaced apart vertically relative to the front wall, each contour adjusting mechanism having plate means which are horizontally adjustable to engage the inner surface of the front wall; and adjustable head rest mounted to the frame structure; means for adjusting the location of said head rest relative to said back rest; and adjustable seat pan mounted to the frame structure; means for adjusting the location of said seat pan relative to said back rest; at least one adjustable arm rest connected to the back rest and linkage means connecting the head rest to said seat pan and said at least one adjustable arm rest for maintaining the relationship between the height of said at least one adjustable arm rest, said seat pan and said head rest; a decoder; and a central controller; and a portable device profile defining means having a prerecorded particular spinal profile, or portion thereof, of an occupant of the chair encoded thereon, said spinal profile, or portion thereof, representing a condition of least intradiscal pressure of the occupant of the chair, said portable device engaging the chair to be read by said decoder and to activate said central controller for controlling the plurality of contour adjusting mechanisms for adjusting the horizontal position of each plate means automatically as a function of the prerecorded particular spinal profile, or portion thereof, so that the outer surface of the front wall automatically conforms to the prerecorded particular spinal profile, or portion thereof.

* * * * *